(12) United States Patent
Chu et al.

(10) Patent No.: US 11,513,858 B2
(45) Date of Patent: Nov. 29, 2022

(54) SYSTEM FOR OPERATING AND METHOD FOR ARRANGING NODES THEREOF

(71) Applicant: NATIONAL APPLIED RESEARCH LABORATORIES, Taipei (TW)

(72) Inventors: Chin-Chen Chu, Hsinchu (TW); Hung-Fu Lu, Hsinchu (TW); Jheng Yu Chen, Hsinchu (TW); San-Liang Chu, Hsinchu (TW); August Chao, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 131 days.

(21) Appl. No.: 17/109,657

(22) Filed: Dec. 2, 2020

(65) Prior Publication Data

US 2022/0027200 A1  Jan. 27, 2022

(30) Foreign Application Priority Data

Jul. 22, 2020 (TW) .................... 109124832

(51) Int. Cl.
*G06F 15/16* (2006.01)
*G06F 9/50* (2006.01)
(Continued)

(52) U.S. Cl.
CPC .......... *G06F 9/5027* (2013.01); *G06F 9/4406* (2013.01); *H04L 67/10* (2013.01); *G06F 9/455* (2013.01); *G06F 2209/5021* (2013.01)

(58) Field of Classification Search
CPC ...... G06F 9/5027; G06F 9/4406; G06F 9/455; G06F 2209/5021; G06F 9/5038; G06F 9/5066; H04L 67/10
See application file for complete search history.

(56) References Cited

U.S. PATENT DOCUMENTS 10,037,513 B2 * 7/2018 Heit ..................... G06Q 20/042
10,148,736 B1 * 12/2018 Lee ....................... G06F 9/5066
(Continued)

FOREIGN PATENT DOCUMENTS

EP  248403 A * 12/1987 .......... G06F 9/4843
EP  0706685 B1 * 6/1994
JP  4612961 B2 * 1/2011

OTHER PUBLICATIONS

Osato, Grid Middleware for Effectively Utilizing Computing Resources: CyberGRIP, Jan. 2004, Fujitsu Scientific & Technical Journal, p. 264. (Year: 2004).*

*Primary Examiner* — Ario Etienne
*Assistant Examiner* — Thorne E Waugh
(74) *Attorney, Agent, or Firm* — Rosenberg, Klein & Lee

(57) ABSTRACT

The present application reveals a system for computing and a method for arranging nodes thereof, which is applied for a remote host connected with a plurality of computing nodes divided to a plurality of first nodes and second nodes due to a first computing mode and a second computing mode. After the remote host receives a job, the remote host evaluates the computing nodes in accordance with the job and a corresponding priority weight parameter to generate a job beginning data to set the first nodes or the second nodes and to proceed the job. While setting the first or the second nodes, the remote host provides the corresponding system image to the corresponding nodes; while the first or the second nodes are full in resource arrangement, the empty nodes will be converted to the supplement nodes with the corresponding system image from the remote host.

7 Claims, 10 Drawing Sheets

(51) Int. Cl.
    *G06F 9/4401*     (2018.01)
    *H04L 67/10*     (2022.01)
    *G06F 9/455*     (2018.01)

(56) References Cited

U.S. PATENT DOCUMENTS

| | | | | |
|---|---|---|---|---|
| 2007/0233838 | A1* | 10/2007 | Takamoto | G06F 9/5077 709/226 |
| 2008/0062891 | A1* | 3/2008 | Van der Merwe | H04L 45/22 370/254 |
| 2008/0229320 | A1* | 9/2008 | Ueda | G06F 9/5038 718/104 |
| 2010/0274890 | A1* | 10/2010 | Patel | H04L 47/125 718/1 |
| 2021/0326210 | A1* | 10/2021 | Sharma | G06F 11/1484 |
| 2022/0027200 | A1* | 1/2022 | Chu | G06F 9/4406 |

\* cited by examiner

SYSTEM FOR OPERATING AND METHOD FOR ARRANGING NODES THEREOF

FIELD OF THE INVENTION

The present application refers to a system and its method, particularly a system for operating and a method for arranging nodes thereof, for resource distribution of the operating system and its hosts and providing a high-speed operating platform to distribute the hosts of first operating mode and secondary operating mode.

BACKGROUND OF THE INVENTION

Generally high-speed operating devices exchanges data through networks or interior communication networks, allowing user ends of companies or organizations operate high-speed operating devices to support operations or to provide operating services to sub-vendors, particularly, data centers may include a plurality of interconnected computer systems and provide operating resources to data center users. In order to improve the usage of operating resources in each of the data centers, virtualization technology is necessary to be arranged and applied for allowing a single physical operating device manage at least one virtual device, wherein the virtual device is an independent operating device to provide display and operation to the data center users. In the case of virtualization technology, a single physical operating device can dynamically create, maintain, delete or additionally manage at least one virtual machine. User ends can request computer resources from the data centers, including a single operating device or network-linked operating devices in configuration for providing virtual machine resources with a dynamic change.

In an ordinary system configuration, an operating system can configure virtual machine embodiments according to the types of virtual devices and provide specific operating service functions. The operating complexity of computer architecture has developed from a single processor with a single core to the multi-core-processors associated computer architecture, or even a high-performance operating core served by a graphics processing unit (GPU) is developed. In addition, High Performance Computing (HPC) uses a plurality of computers as the operating group to perform operating tasks according to varied computing resource topology and processor architecture, using the processing sequence of high-performance computing as the "parallel processing sequence" to have computers process in parallel.

Yet, for high-performance operating, data center currently fails to support rapid switching between the virtualized and physical operating modes, and haven't supported the resource distribution management under the coexistence of virtualized and physical operating resources yet. As such, the existing technology is still insufficient to support both virtualized and physical operating resources.

Based on the aforesaid issue, the present application provides a system for operating and a method for arranging nodes thereof, which loads corresponding system image data to a corresponding host performing an operating task during operating task scheduling, and follows the operating task to set to the first host or second host in the corresponding operation mode, allowing to flexibly use the operating system in different operation modes.

SUMMARY

One objective of the present application is to provide a system for operating and a method for arranging nodes thereof; through remote host connecting operating hosts under different operating modes, it can set a plurality of first hosts and second hosts; the remote host follows the received operating task providing them to the corresponded first hosts or second hosts, and provides system image to fast load the operating tasks to the corresponded hosts.

One objective of the present application is to provide a system for operating and a method for arranging nodes thereof, while the distributing data loading of first hosts or second hosts is full, it turns the other side of hosts not under full loading into the supplementary hosts and provide the corresponded system image, allowing the operating system to control the operating hosts to immediately switch the operating mode and support the operating tasks under operation.

The present application reveals a method for arranging nodes of the system for operating, by using a remote host to distribute the resource of a plurality of operating hosts; the distribution first makes an user end device to provide an operating task to the remote host; then, the remote host follows the mission to assess the operating resource of the operating hosts and generate a task initial data; next, the remote host follows the task initial data to judge the operating modes of the operating hosts; when the task initial data corresponds to a parallel operating mode and performs sorting, the remote host provides a first image data to the first hosts, enabling the first hosts to load the first system image data and perform the operating task; when the task initial data corresponds to a logic operating mode and performs sorting, the remote host provides a second image data to the second hosts, enabling the second host to load the second system image data and perform the operating task; wherein when a first resource distribution data corresponding to the first host is full, the remote host switches part of the second hosts as a plurality of first supplementary hosts, and provides the first system image data to the first supplementary hosts, enabling the first supplementary hosts to load the first system image data; when a secondary resource distribution data corresponding to the second hosts is full, the remote host switches part of the first hosts as a plurality of second supplementary hosts and provides the second system image data to the second supplementary hosts to load the second system image data. Through this operation, the present application lets the remote host connect operating hosts under different operating modes to flexibly run different operating modes and perform the operating tasks. While the load of first hosts or second hosts are full, set the other side hosts not full-loading yet as the supplementary hosts to further perform flexible distribution of operating hosts in the operating task.

The present application provides an embodiment in which the operating hosts are electronic devices with operating capability, which is the heterogeneous hardware with accelerate computing resource and in a distributed computing architecture.

The present application provides an embodiment in which in the step that the remote host follows the task initial data to set the first hosts or second hosts, when the task initial data is corresponding to the second operating mode, the remote host further sends the task initial data to a master node in the second hosts; and the master node sends the task initial data to a slave node; and the remote host provide the second system image data to the slave node through the master node to have the slave node load the second system image data.

The present application provides an embodiment in which in the step that the remote host follows the operating task to assess the operating resource toward the operating hosts along with a corresponded priority weight; the remote host follows a queue weight, an operating resource testing parameter, an operating mode and a maintaining parameter of the corresponded operating task to compute the corresponded priority weight.

The present application another reveals an operating system that includes a plurality of operating hosts, a remote host and a user end device. The remote host connects to the operating hosts and a database and the user end device connects to the remote host; the user end device sends an operating task to the remote host; the remote host follows the operating task to assess the operating resource of the operating hosts and generates a task initial data; the remote host follows the task initial data to judge the operating modes of the operating hosts; when the task initial data corresponds to a parallel operating mode, the remote host provides a first image data to the first hosts; when the task initial data corresponds to a logic operating mode, the remote host provides a second image data to the second hosts; wherein while a first resource distribution data loading of the first hosts is full, the remote host switches part of the second hosts as a plurality of first supplementary hosts and sends the first system image data to the first supplementary hosts; while a second resource distribution data loading of the second hosts is full, the remote host switches part of the first hosts into a plurality of second supplementary hosts and sends the second system image data to the second supplementary hosts. Through this operation, the present application lets the remote host connect to operating hosts with different operating modes to perform different operating modes and the operating task in a flexible way; when a second resource distribution data corresponding to the first hosts or second hosts is full, it turns the other side of hosts not under full loading into the supplementary hosts, further distribute the operating hosts in the operating task in a flexible way.

The present application provides the other embodiment, in which the operating hosts are the electronic devices with operating capability, which is the heterogeneous hardware with accelerate computing resource and in a distributed computing architecture.

The present application provides the other embodiment, in which the second hosts have at least one master node and a plurality of slave nodes; the remote host sends the task initial data and second system image data to the slave node and loads them through the master node.

The present application provides the other embodiment, in which the remote host follows a queue weight, an operating resource testing parameter, an operating mode and a maintaining parameter of the corresponded operating task to compute the priority weight.

The present application provides the other embodiment, in which the operating hosts are the one with operating capability; each host is equipped with a role module, a first interface, a second interface and a remote interface. The role module is equipped with a first role unit and a second role unit; the first role unit corresponds to the first role mode; the second role unit corresponds to the second role mode; the first role unit read the first image data and load it into the second role unit; the first interface connects to the first role unit; the second interface connects to the second role unit; the remote interface connects the first interface and second interface in series, and it connects to the remote host

DETAILED DESCRIPTION

To enable the Review Committee members having deeper realization and understanding on the features and functions of the present application, we hereby put the embodiment and detailed explanation in below:

Due to the fact that the traditional operating system cannot flexibly distribute the virtual operation resource and physical operating resource, in the present application, we set forth a resource distribution of operating system and host in the prospective of solving the well-known issue of unable to flexibly distributing the operating resource.

Figure 1A:
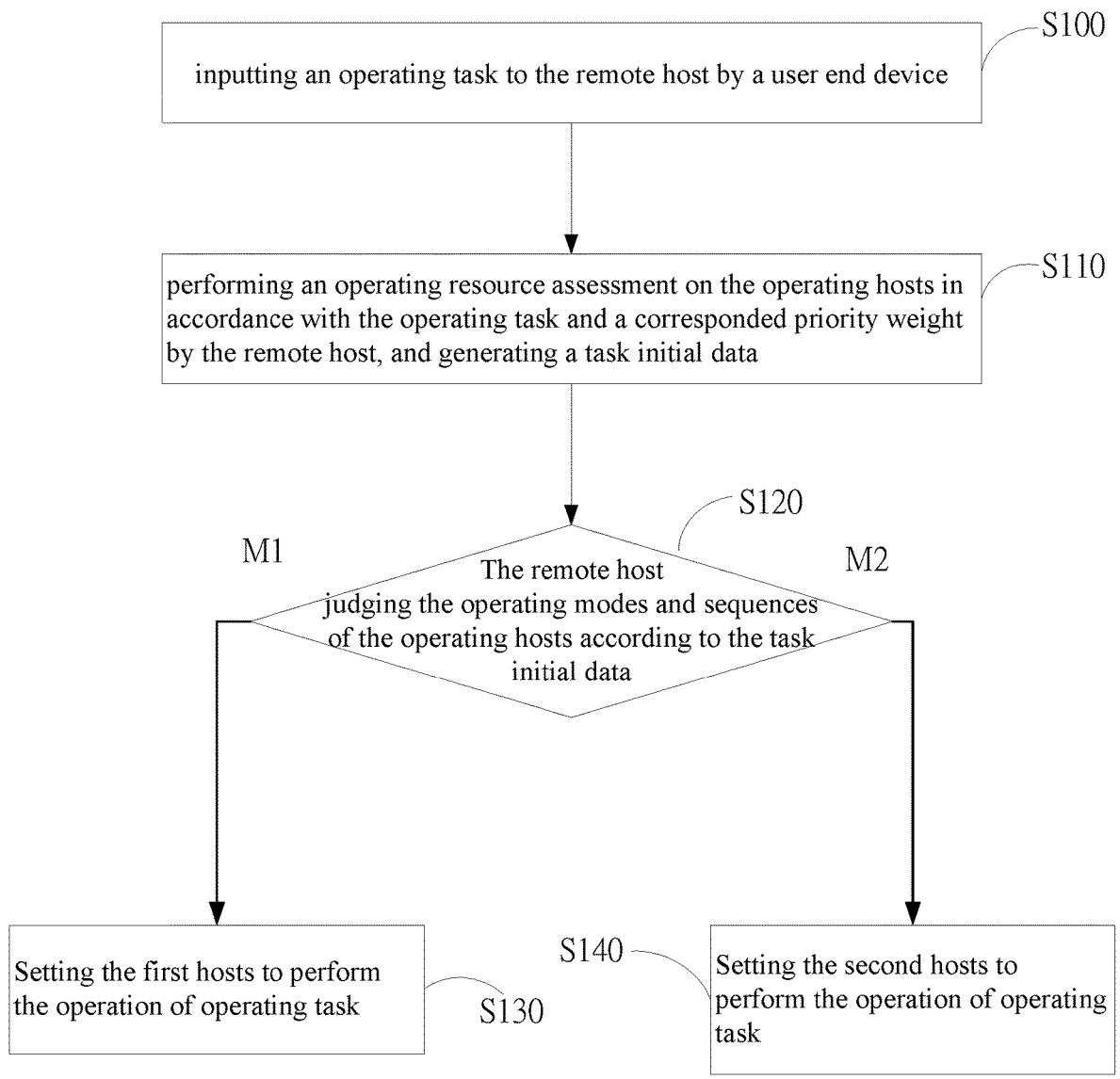
FIG. 1A to FIG. 1B: which are flowcharts of an embodiment of the present application.

In the following statement, we will further interpret the features and respective structure of the method in distributing the operating system and host resource:

First, refer to FIG. 1A; it is the flowcharts of an embodiment of the present application. This figure shows the resource distribution method of the operating system's hosts in the present application, the steps include:

Step S100: inputting an operating task to the remote host by a user end device;

Step S110: performing an operating resource assessment on the operating hosts in accordance with the operating task and a corresponded priority weight by the remote host, and generating a task initial data;

Step S120: the remote host judging the operating modes and sequences of the operating hosts according to the task initial data;

Step S130: Setting the first hosts to perform the operation of operating task; and Step S140: Setting the second hosts to perform the operation of operating task.

Figure 2A:
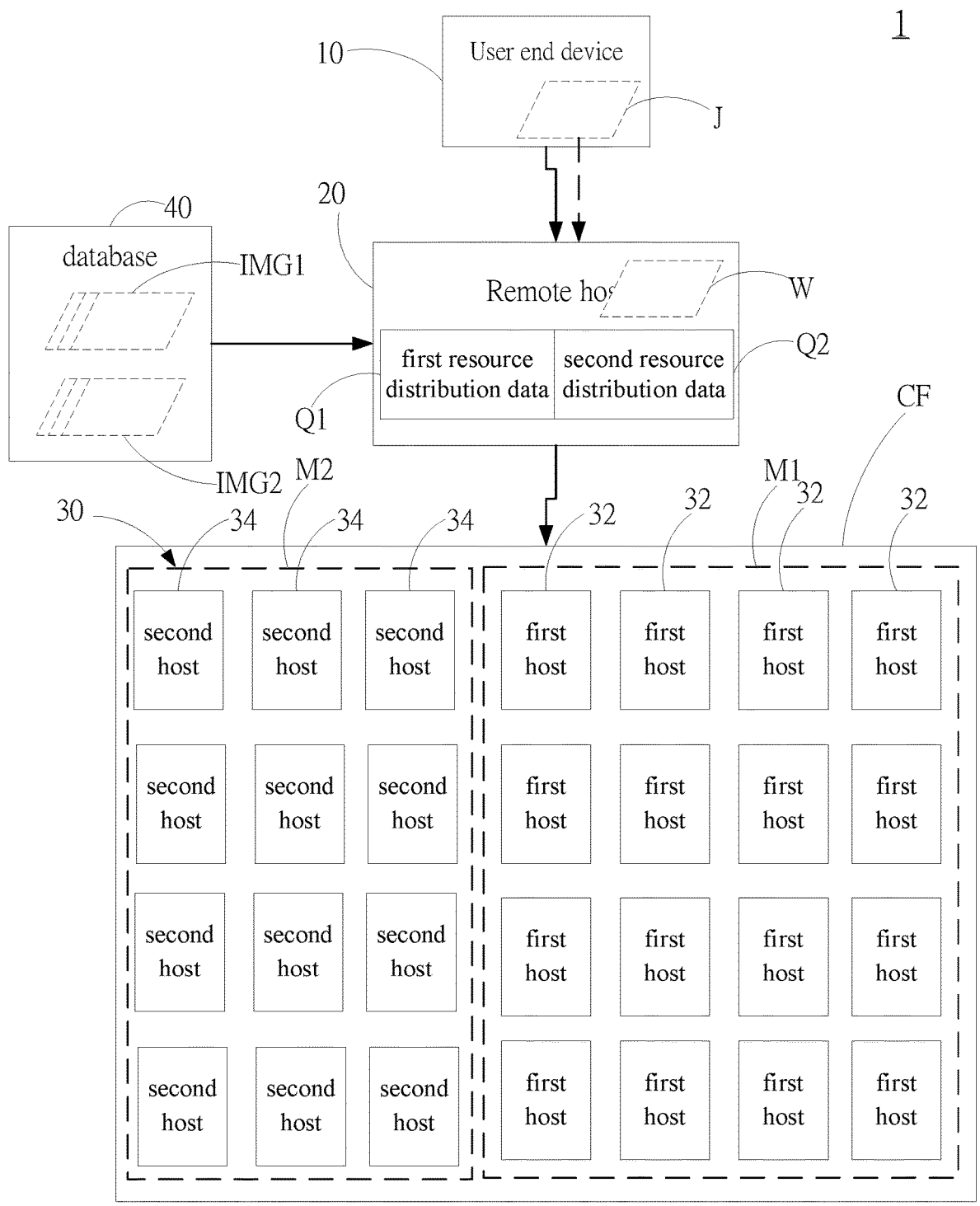
FIG. 2A to FIG. 2C: which are schematic diagrams of steps in an embodiment of the present application.
Figure 2B:
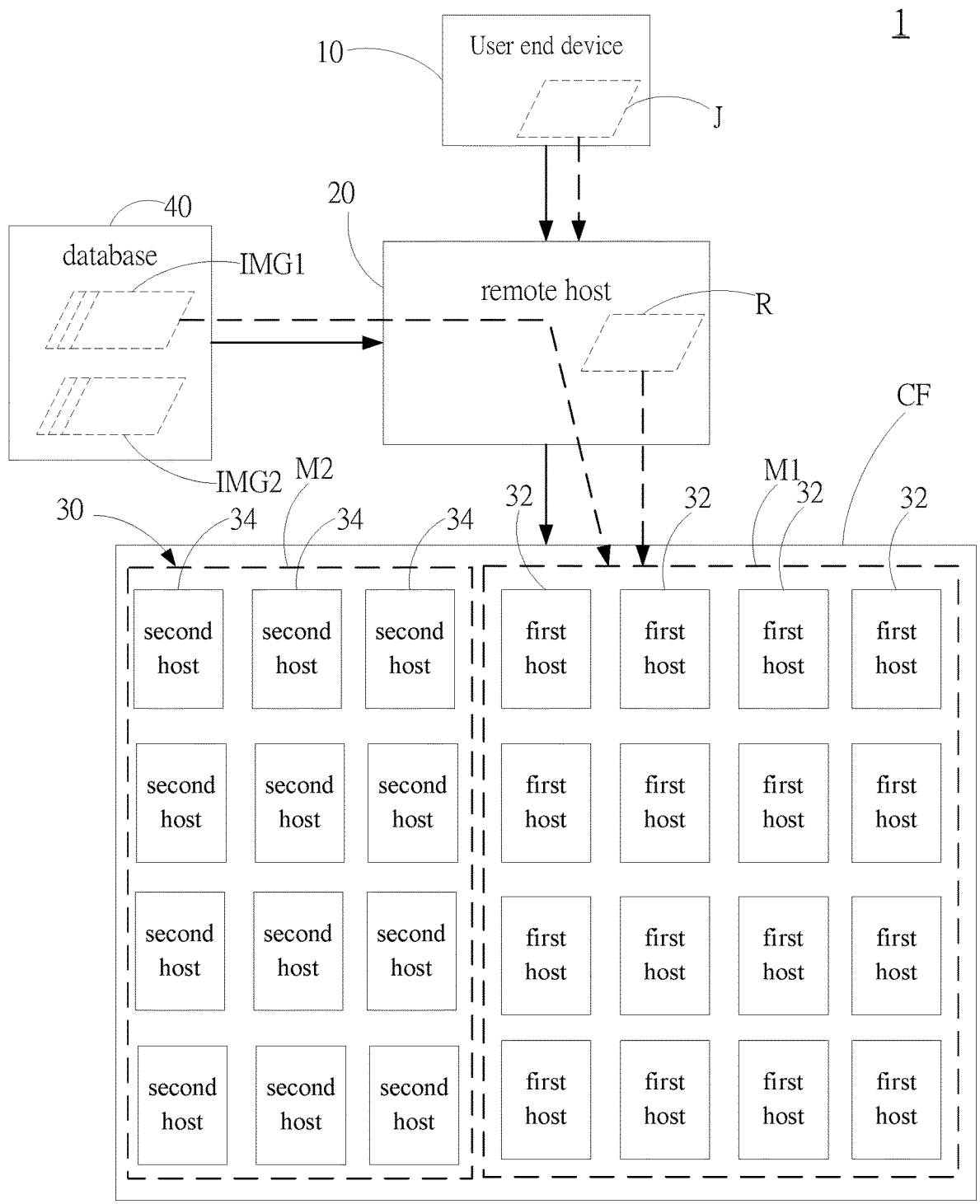
Figure 2C:
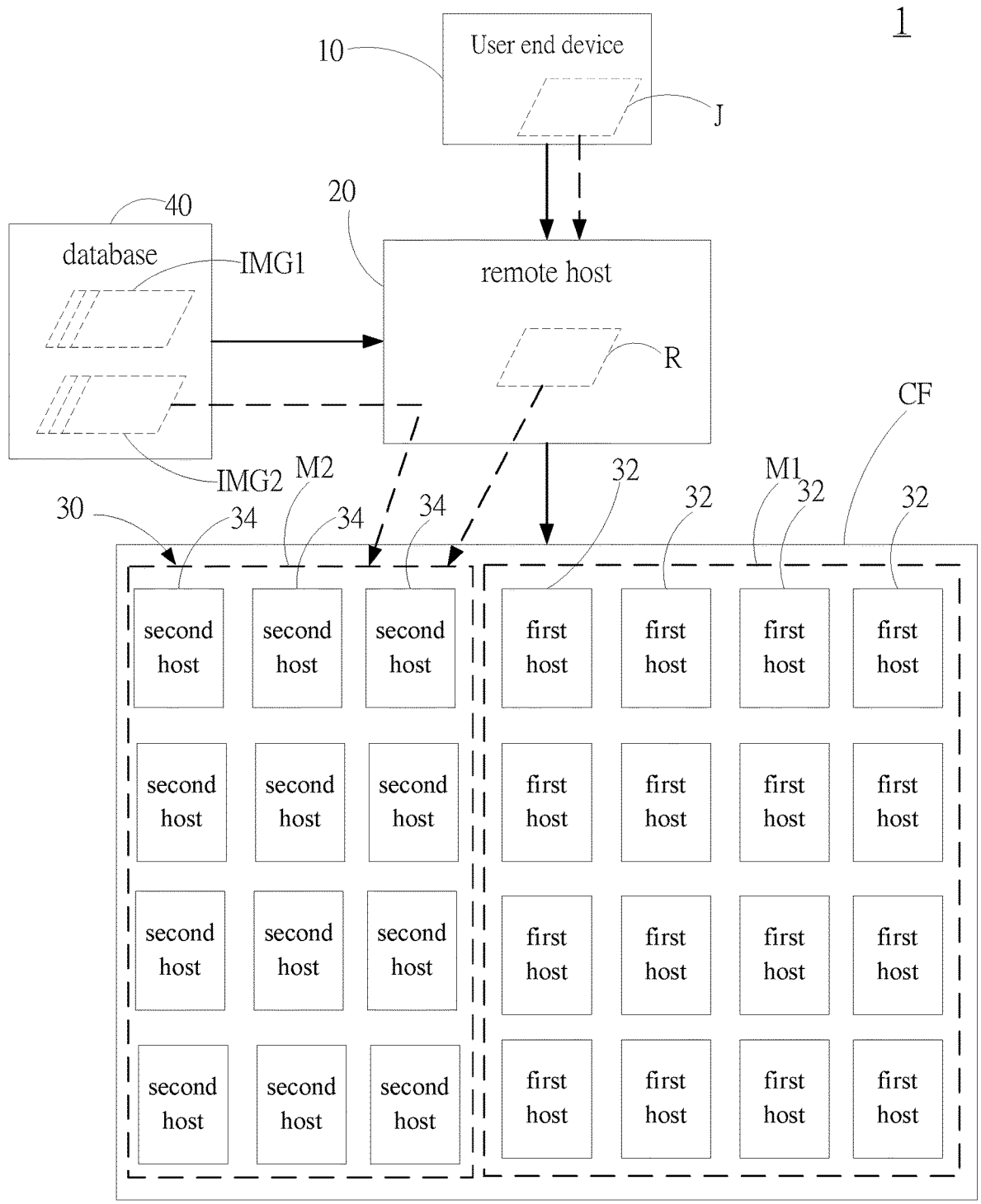

Refer to FIG. 2A to FIG. 2C, which are the Schematic diagram of steps in an embodiment of the present application. The Operating System 1 in the present application includes at least an user end device 10, a remote host 20 and a plurality of operating hosts 30; user end device 10 connects to remote host 20 through a network (NET); remote host 20 connects to operating host 30; operating host 30 is set to a distributed computing architecture (CF), such as the server farm, in which the operating modes of operating host 30 are divided to a first operating mode M and a second operating mode M2, for example, a parallel operating mode and a logic operating mode, divided to a plurality of first hosts 32 and second hosts 34; this embodiment uses the operating hosts 30 as the electronic devices with operating capability; due to the consecutive upgrading, CPU no longer is the only one that can provide operating resource; Graphic Processing Unit (GPU) also can provide it, or further have the Programmable logic gate array (FPGA) accelerator to provide operating resource, that is, the operating host 30 are the heterogeneous hardware with accelerate computing resource that can provide user in calculating the operating resource; therefore, in the present application, operating host 30 are not restricted to computer host. Moreover, remote host 20 can further connect to a database 40, data storage corresponds to the first system image data of first host 32 and second system image data of second host 34; corresponding to the distribution of first host 32 and second host 34, remote host 20 shall have a first resource distribution data Q1 and a first resource distribution data Q2.

Further refer to FIG. 3A, each operating host 30 includes a Role Module 32A, a first interface e 34A, a Second Interface 36A and a Remote Interface 38A, wherein Role Module 32A is equipped with a first role unit 322A and a second role unit 324A, first role unit 322A connects to first interface 34A, second role unit 324A connects to Second Interface 36A, first interface 34A and Second Interface 36A connect to Remote Interface 38A respectively, operating host 30 connects to remote host 20 through Remote Interface 38A; in this embodiment, first role unit 322A and second role unit 324A are the parallel operation unit and virtualized operation unit, which makes first interface 34A and Second Interface 36A become the parallel interface and virtualized interface; when operating host 30 is first host 32, first role unit 322A dominates the operating task and dispatches the operation dealing units in operating host 30, for example, CPU and GPU; when operating host 30 is second host 34, second role unit 324A dominates the operating task, and second role unit 324A dispatches the operation dealing units in operating host 30. Remote Interface 38A reports the loading status of operating host 30 back to remote host 20.

Figure 4:
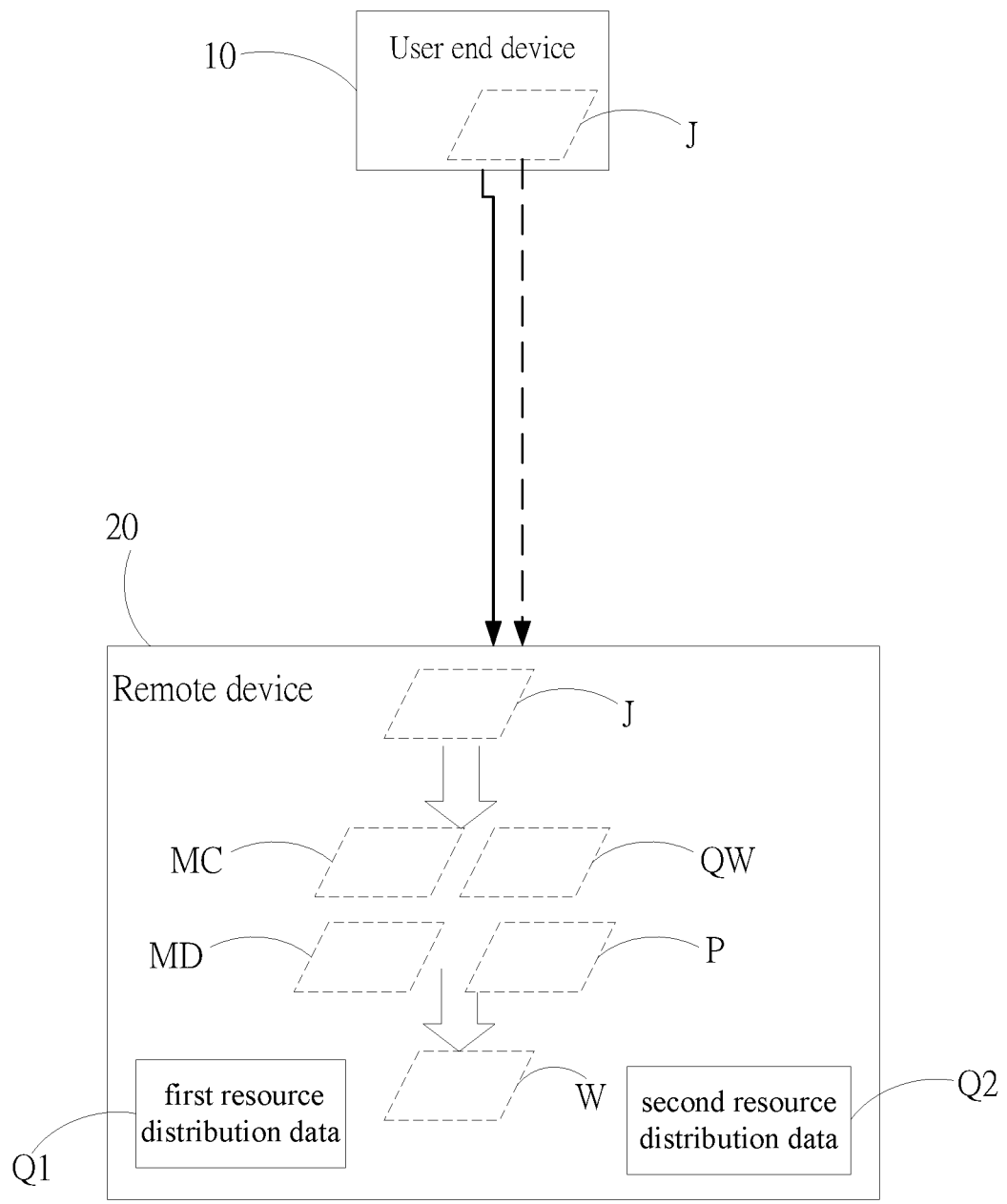
FIG. 4: which is a schematic diagram of priority weight in an embodiment of the present application.

In Step S100, user uses a User end device 10 to connect remote host 20, allowing remote host 20 to receive the operating task J inputted by user, making remote host 20 perform uniform scheduling operation and continue to perform Step S110. In Step S110, during the uniform scheduling operation, remote host 20 follows the operation of operating task J to analyze the corresponded priority weight W and assess operating host 30, in the goal of ensuring that the corresponded performing environment of operating task J fits the first or second operating mode, and generating the corresponded task initial data R. As shown in FIG. 4, remote host 20 follows Queue Weight QW, an operating resource testing parameter P, an operating mode MD and a maintaining parameter MC corresponding to operating task J to calculate and obtain the priority weight; Queue Weight QW is the one that enters remote host 2; operating resource testing parameter P is the testing parameter that corresponds to the operating resource of operating hosts 30; operating mode MD is the parallel operating mode and logic operating mode; maintaining parameter MC is the setting parameter corresponding to maintaining operating task J. remote host 20 follows the operating of operating task J to confirm whether or not the virtualized operating mode is applicable, allowing the operating resource of operating system 1 to perform operating service under better utilizing efficiency, and further via the priority weight W's corresponding sorting time, when operating task J's corresponding priority weight W is greater than all missions in present sorting, remote host 20 continues to in-priority sort operating task J in Step S120.

Figure 1B:
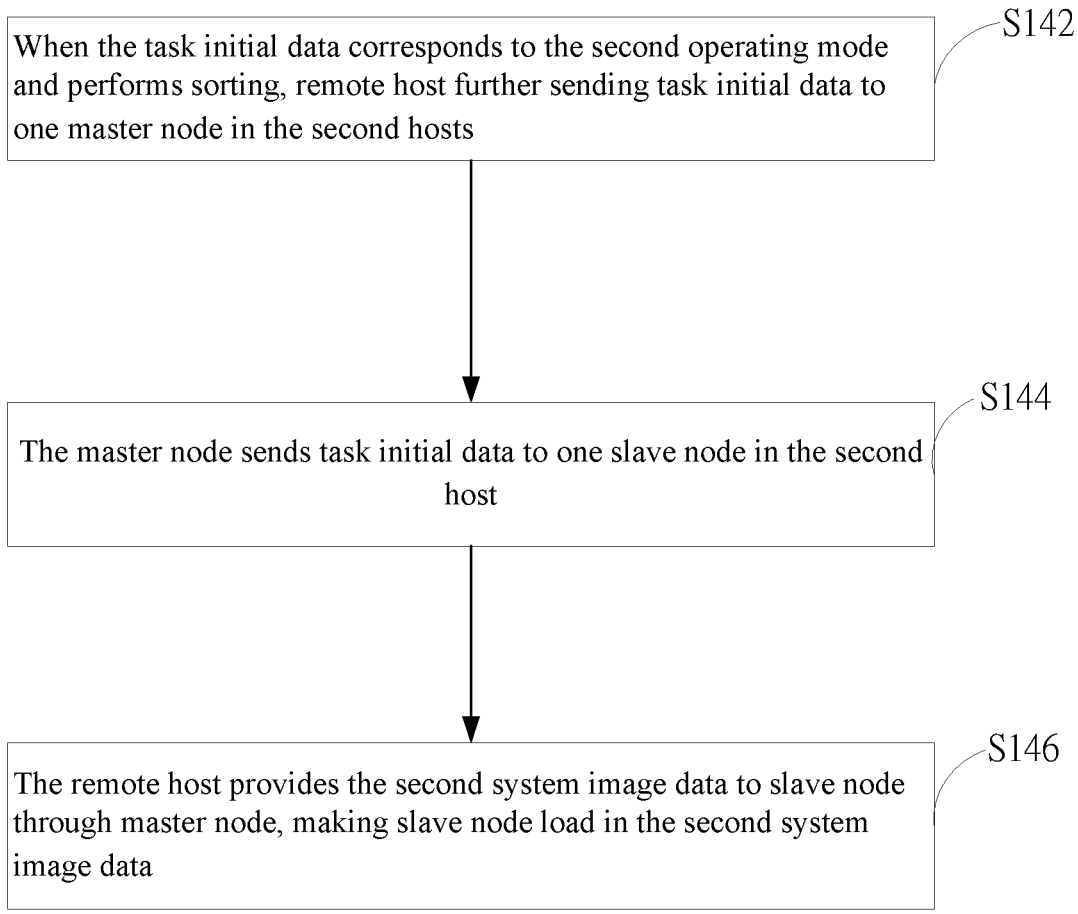

Continue to above, in Step S120, remote host 20 follows the task initial data R generated by Step S110 to judge the corresponded operating mode of operating hosts that can be dispatched; that is, when task initial data R corresponds to first host 32 and is under sorting, remote host 20 will judge the available hosts in first host 32 and continues to perform Step S130; when task initial data R corresponds to second host 34 and is under sorting, remote host 20 will judge the available hosts in poll second host 34 and continues to perform Step S140. In Step S130, remote host 20 reads first system image data IMG1 from database 40 and sends it to the corresponded first host 32 and simultaneously sends operating task J to the corresponded first host 32, making first host 32 to load in the first system image data IMG1, used to perform the operation of operating task J. In Step S140, remote host 20 reads the second system image data IMG2 from database 40 and sends it to the corresponded second host 34, making second host 34 to load in the second system image data used to perform the operation of operating task J. Refer to FIG. 1B for further information. Step S140 includes:

Step S142: When the task initial data corresponds to the second operating mode and performs sorting, remote host further sending task initial data to one master node in the second hosts;

Step S144: The master node sends task initial data to one slave node in the second host; and Step S146: The remote host provides the second system image data to slave node through master node, making slave node load in the second system image data.

Figure 2D:
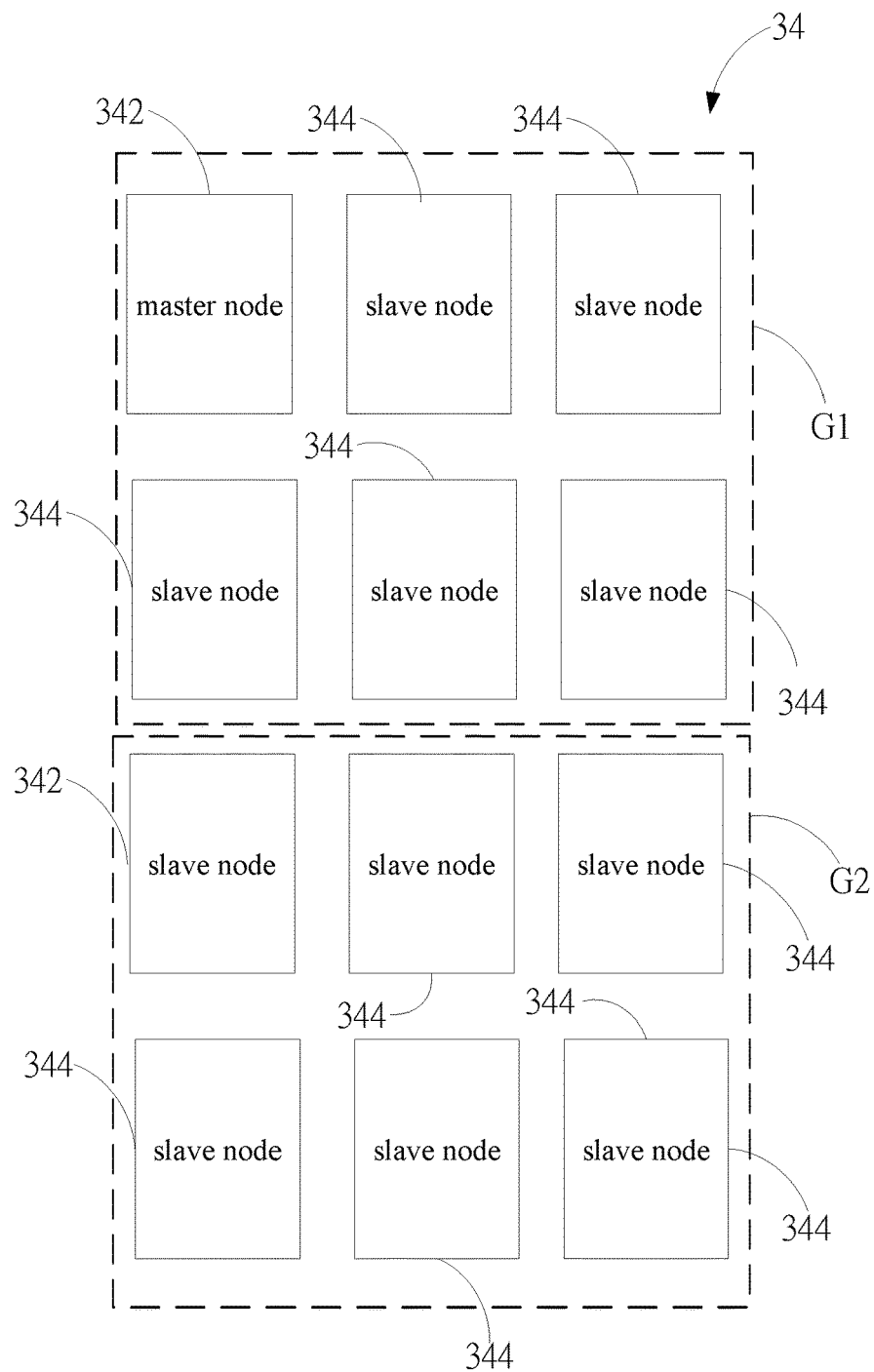
FIG. 2D: which is supplementary schematic diagram of second host in FIG. 2C.
Figure 3:
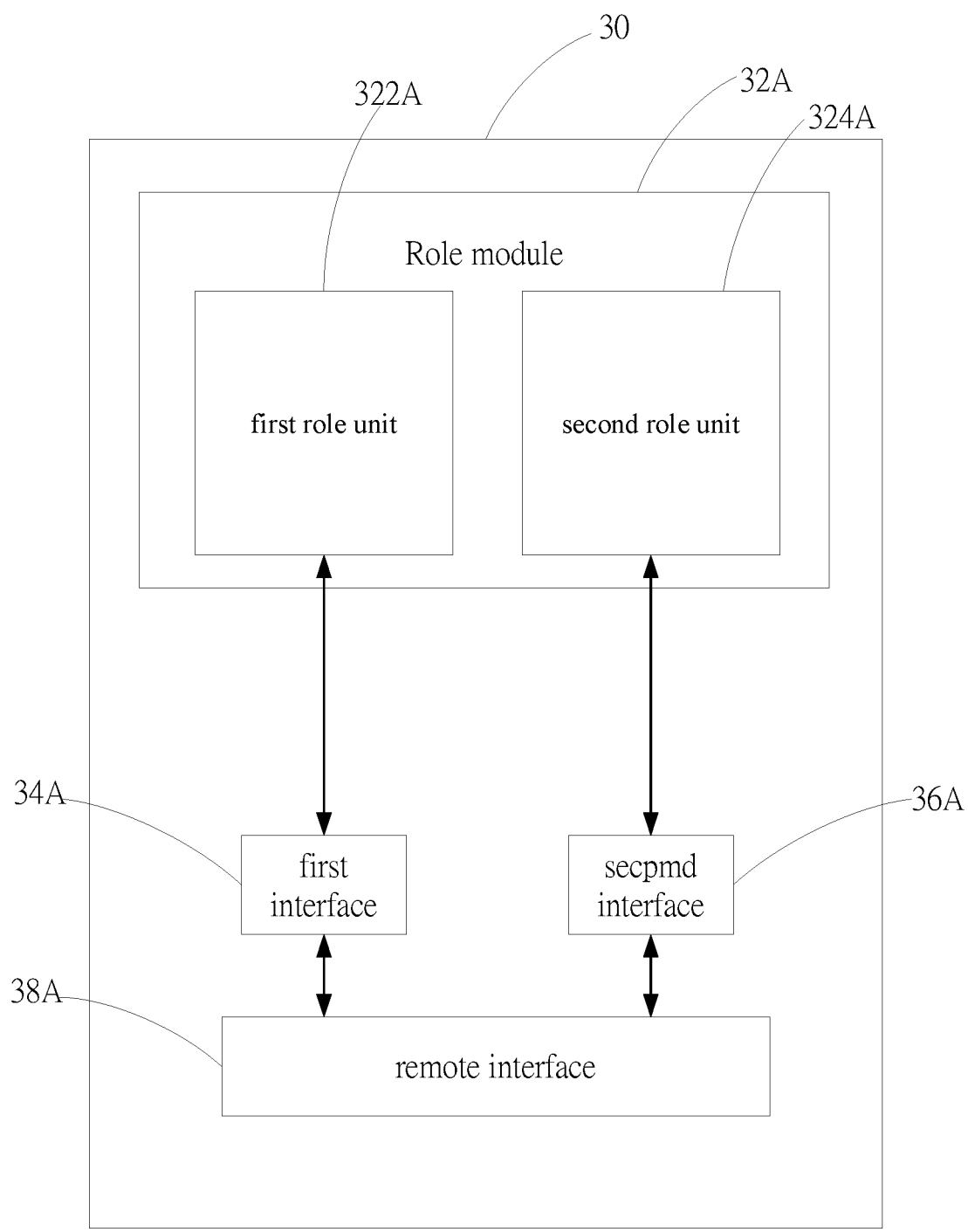
FIG. 3: which is a schematic diagram of operating host in an embodiment of the present application.

In Step S140, further refer to FIG. 2C, FIG. 2D and FIG. 3, remote host 20 judges that task initial data R corresponds to second operating mode M2, by mean of that, remote host 20 sends the task initial data R to one master node 342 in second host 34, wherein second host 34 bases on second operating mode, the second operating mode in this embodiment is the logic operating mode, as shown in FIG. 2D, second host 34 will divides to at least one master node 342 and a plurality of slave nodes 344, that is, set the master mode in second role unit 324 and let second role unit 324 dominate the operating task, the rest second host 34 are in slave mode set by second role unit 324 and follow the control of master node 342, master node 342 distributes them to the operating task performed by slave node 344, in which second host 34 follows mission requirement to set at least one master node 342, and set a plurality of slave nodes 344, in this embodiment, it takes two master node 342 for example, used to explain that second host 34 is divided to group G1 and G2 due to mission requirement.

Refer to FIG. 1B, continue to Step S144 and let master node 342 distributes the received task initial data R to at least one slave node 344; continue to Step S146, remote host 20 sends the second system image data IMG2 in database 40 to slave nodes 344 through master node 342, letting slave node 344 perform the corresponded operating task.

Figure 5:
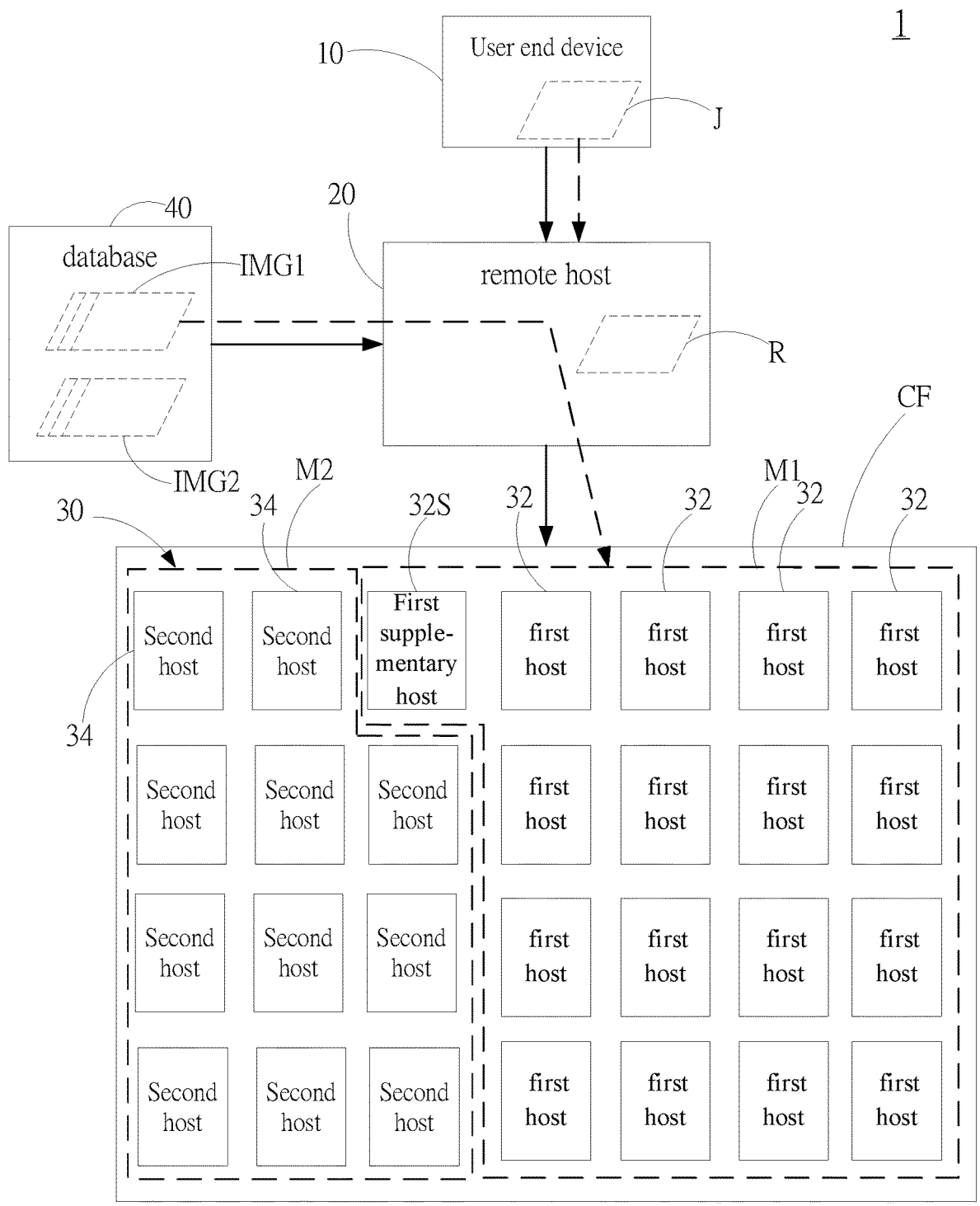
FIG. 5: which is a schematic diagram of generating the first supplementary host in an embodiment of the present application.
Figure 6:
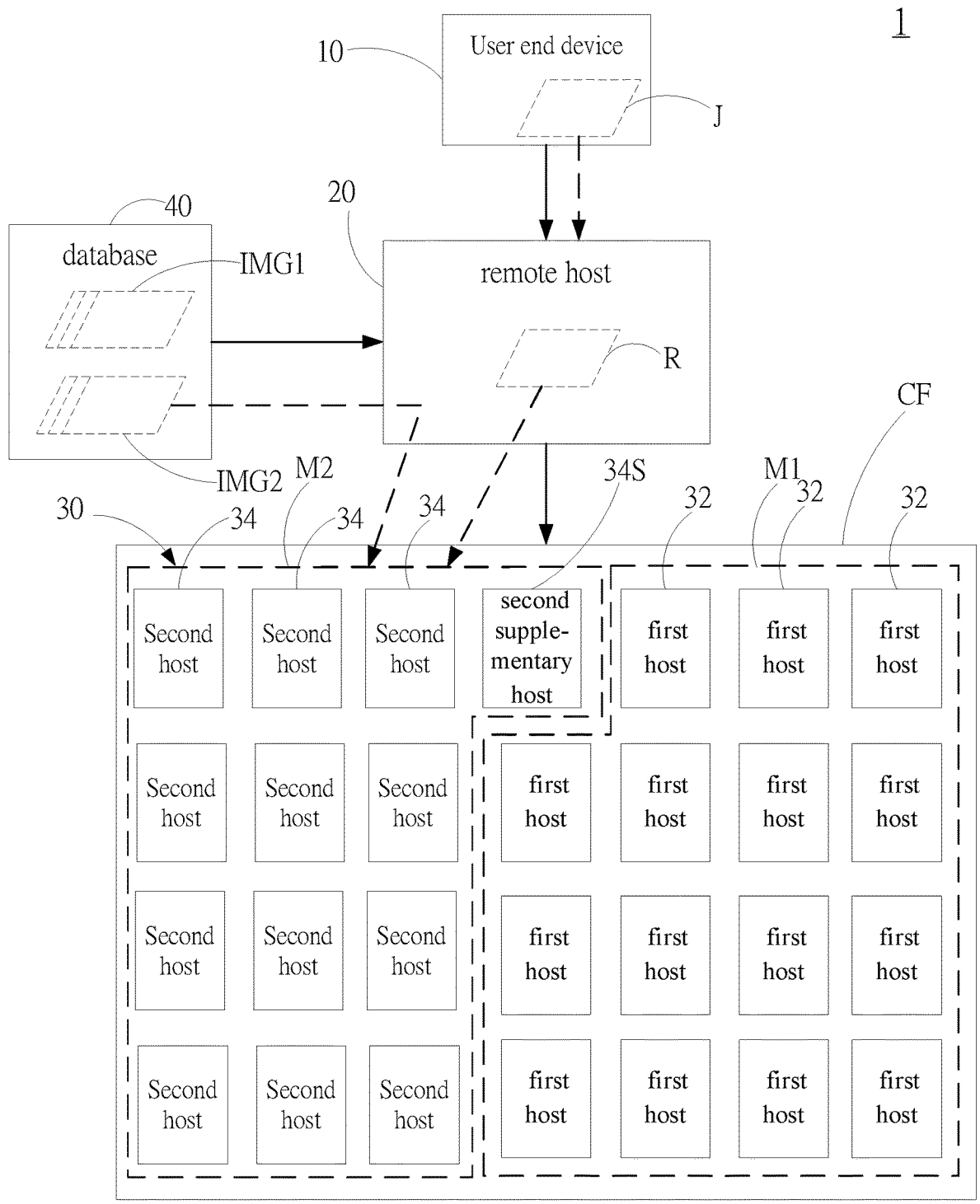
FIG. 6: which is a schematic diagram of generating the second supplementary host in an embodiment of the present application.

Moreover, refer to FIG. 1A and FIG. 3, as shown in FIG. 5, in Step S120, when remote host 20 judges that first resource distribution data Q1 corresponding to first hosts 32 is full, Remote Host 20 confirms the idle or going to idle hosts in group of second hosts 34, controls to turn the idle second host 34 into primary supplementary host 32S, that is, turn the role module 32 in operating host 30 to first role unit 322 that dominates the operating task, letting Remote Host 20 send first system image data IMG1 to primary supplementary host 32S. As shown in FIG. 6, in Step S120, when Remote Host 20 judges that the second resource distribution data Q2 corresponding to second host 34s full, Remote Host 20 confirms the idle or going to idle hosts in group of first host 32 and controls to turn the idle second host 32 into secondary supplementary host 34S, that is, turn the role module 32 in operating host 30 to second role unit 324 that dominates operating task, letting Remote Host 20 send second system image data IMG2 to secondary supplementary host 34S. In this way, Remote Host 20 follows operating task requirement adjusting the idle or going to idle operating resource in another operating mode to the corresponded supplementary hosts, used to supplement the supporting operating resource.

In summary, the operating system and host resource distribution method of the present application uses a remote host to connect to a plurality of operating hosts, and is divided into a first host and a second host, and follow the operating task to generate the task initial data, assigned to the corresponded host to perform the operating task. In addition, the first host and the second host can support each other, making the mission dispatching of the first host and the second host more flexible

What is claimed is:

1. A method for arranging nodes in a system for operating, applied to a remote host of the system connected to a plurality of operating hosts of the system; including the steps of:
    inputting an operating task to the remote host by a user end device;
    performing an operating resource assessment on the operating hosts in accordance with the operating task and a corresponded priority weight by the remote host, and generating a task initial data, wherein the remote host operates the corresponded priority weight according to a queue weight, an operating resource testing parameter, an operating mode and a maintaining parameter of the corresponded operating task;
    the remote host judging the operating modes and sequences of the operating hosts according to the task initial data; and
    when the task initial data corresponds to a parallel operating mode and performs sorting, the remote host providing a first image data to part of the operating hosts and set them as a plurality of first hosts; when the task initial data corresponds to a logic operating mode and performs sorting, the remote host providing a second image data to other part of the said operating hosts and set them as a plurality of second hosts;
    wherein when one first resource distribution data corresponding to the first hosts is full, the remote host switches part of the said second hosts into a plurality of first supplementary hosts and provides the first system image data to the first supplementary hosts, letting the first system image data be loaded in the first supplementary hosts; when a second resource distribution data corresponding to the second hosts is full, the remote host switches the said first hosts into a plurality of second supplementary hosts and provides a second system image data to the second supplementary hosts, letting the second system image data be loaded in the second supplementary hosts.

2. The method for arranging nodes in the system for operating of claim 1, in which the operating hosts are equipped in a distributed computing architecture.

3. The method for arranging nodes in the system for operating of claim 1, in which the steps that the remote host follows the task initial data to set the first hosts or second hosts include:
    when the task initial data corresponds to the secondary operating mode, the remote host further sends the task initial data to one master node in operations of the second hosts;
    the master node sends the task initial data to one slave node in the operations of the second hosts; and
    the remote host provides the second system image data to the slave node through the master node, letting the slave node load in the second system image data.

4. A system for operating, which includes:
    a plurality of operating hosts;
    a remote host, connected to the operating hosts and a database, the database stores a first system image data and a second system image data; the remote host sets the operating hosts as a plurality of first hosts and second hosts according to a parallel operating mode and a logic operating mode; and
    a user end device, connected to the remote host, sends an operating task to the remote host; the remote host accesses the operating resource of the operating hosts according to the operating task and a corresponded priority weight and generates a task initial data; the remote host judges the operating modes and sequences of these operating hosts according to the task initial data; when the task initial data corresponds to the parallel operating mode and performs sorting, the remote host provides a first image data to the first hosts; when the task initial data corresponds to the logic operating mode and performs sorting, the remote host provides a second image data to the second hosts; when one first resource distribution data corresponding to the first hosts is full, the remote host switches part of the second hosts to a plurality of first supplementary hosts, and sends the first system image data to the first supplementary hosts; when one second resource distribution data corresponding to the second hosts is full, the remote host switches the said first hosts to a plurality of second supplementary hosts and sends the second system image data to the second supplementary hosts;
    wherein the remote host operates the corresponded priority weight according to a queue weight, an operating resource testing parameter, an operating mode and a maintaining parameter of the corresponded operating task.

5. The system for operating of claim 4, in which the operating hosts are electronic devices with operating capability, each has the heterogeneous hardware with accelerate computing resource, and set in a distributed computing architecture.

6. The operating system of claim 4, wherein the second hosts are indicated as at least one master node and a plurality of slave nodes; the remote host sends the task initial data and the second system image data to the slave node through the master node and load in.

7. The system for operating of claim 4, wherein the operating host includes:
    a role module, equipped with a first role unit and a second role unit; the first role unit corresponds to the first role mode; the second role unit corresponds to the second role mode; the first role unit reads the first image data and loads it into the second role unit;
    a first interface, connected to the first role unit;
    a second interface, connected to the second role unit; and
    a remote interface, connected to the first interface and second interface in serial connections, and connected to the remote host.

* * * * *